(12) United States Patent
Luo

(10) Patent No.: US 10,707,624 B2
(45) Date of Patent: Jul. 7, 2020

(54) FOOLPROOF ELECTRICAL CONNECTOR INTERFACE SYSTEM

(71) Applicant: TI-LANE PRECISION ELECTRONIC CO., LTD., Shenzhen, Guangdong (CN)

(72) Inventor: Baojun Luo, Guangdong (CN)

(73) Assignee: TI-LANE PRECISION ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 16/506,990

(22) Filed: Jul. 9, 2019

(65) Prior Publication Data

US 2020/0169042 A1    May 28, 2020

(30) Foreign Application Priority Data

Nov. 22, 2018   (CN) .......................... 2018 1 1399823

(51) Int. Cl.
| | |
|---|---|
| H01R 13/642 | (2006.01) |
| H01R 13/627 | (2006.01) |
| H02S 40/36 | (2014.01) |
| H01R 13/52 | (2006.01) |
| H02S 40/34 | (2014.01) |

(52) U.S. Cl.
CPC ....... *H01R 13/642* (2013.01); *H01R 13/5202* (2013.01); *H01R 13/627* (2013.01); *H02S 40/34* (2014.12); *H02S 40/36* (2014.12)

(58) Field of Classification Search
CPC ........... H01L 31/0508; H01L 31/02013; H02S 40/36; H02S 40/34; H01R 13/642; H01R 13/5202

USPC .......................................................... 439/65
See application file for complete search history.

(56) References Cited

U.S. PATENT DOCUMENTS

| | | | |
|---|---|---|---|
| 7,387,537 B1 * | 6/2008 | Daily ................. | H01R 13/6272 439/281 |
| 7,713,089 B2 * | 5/2010 | Faust ................ | H01L 31/02008 136/251 |
| 8,535,081 B2 * | 9/2013 | Chikano ............ | H01R 13/6273 439/352 |
| 8,917,052 B2 * | 12/2014 | Zhang ..................... | H02S 40/34 320/101 |
| 10,498,121 B1 * | 12/2019 | Luo ........................ | H02G 3/088 |

(Continued)

*Primary Examiner* — Abdullah A Riyami
*Assistant Examiner* — Marcus E Harcum

(57) ABSTRACT

A foolproof electrical connector interface system includes a connector male, a connector female, two fixing plates and two junction boxes. The connector male and the connector female are fixed in installing slots of a photovoltaic panel; the fixing plates are provided with positioning columns, first hooks and second hooks; the fixing plates are connected with the photovoltaic panel, and then the connector male and the connector female are respectively fixed between the first hooks and between the second hooks; the connector male and the connector female are electrically connected by a wire; the connector male is provided with a male plug; the male plug is provided with a bump; the connector female is provided with a female plug; the female plug is provided with a groove; the junction boxes are waterproof junction boxes; the junction boxes are respectively electrically connected with the connector male and the connector female through wire.

4 Claims, 3 Drawing Sheets

(56) References Cited

U.S. PATENT DOCUMENTS

| | | | | |
|---|---|---|---|---|
| 2008/0149170 A1* | 6/2008 | Hanoka | ................... | H02S 40/34 |
| | | | | 136/251 |
| 2009/0142954 A1* | 6/2009 | Boensch | ........... | H01L 31/02013 |
| | | | | 439/422 |
| 2011/0183540 A1* | 7/2011 | Keenihan | ............... | H01R 31/00 |
| | | | | 439/345 |
| 2011/0220180 A1* | 9/2011 | Cinnamon | .............. | F24S 25/20 |
| | | | | 136/251 |
| 2013/0029542 A1* | 1/2013 | Kraemer | ............. | H01R 4/4809 |
| | | | | 439/843 |
| 2013/0119043 A1* | 5/2013 | Consiglio | ............. | E01C 11/265 |
| | | | | 219/213 |
| 2014/0299173 A1* | 10/2014 | Pilat | ................... | H01L 31/0508 |
| | | | | 136/244 |

* cited by examiner

FOOLPROOF ELECTRICAL CONNECTOR INTERFACE SYSTEM

CROSS-REFERENCE TO RELATED APPLICATIONS

This application claims priority to Chinese Patent Application No. 201811399823.0 with a filing date of Nov. 22, 2018. The content of the aforementioned applications, including any intervening amendments thereto, are incorporated herein by reference.

TECHNICAL FIELD

The disclosure relates to the field of connectors for solar panels, and particularly relates to a foolproof electrical connector interface system.

BACKGROUND OF THE PRESENT INVENTION

With the development of the society and the advancement of science and technology, environmentally-friendly and pure energy has gradually attracted human attention. As an environmentally-friendly and endlessly accessible new energy source, photovoltaics are valued by people. The photovoltaic panel is a common device for converting solar energy, and has high requirements for connectors during the use of the photovoltaic panel, which requires high electrical connection tightness, seal and firmness.

At present, the photovoltaic panel is installed in such a manner that the photovoltaic panel is installed at first and then wires are connected, which is very inconvenient. This is because a plurality of photovoltaic panels needs to be connected in series in order to achieve good power generation effect. In order to realize connection, the wires of two adjacent photovoltaic panels need to be connected by two separate connectors. In addition, electrifying sheets of the photovoltaic panels need to be welded to linear conductors. When there is a problem with the connector or the extension wire, the wires and the panels need to be disassembled successively for replacement. Thus, the entire disassembly and replacement process for the photovoltaic panels is very inconvenient and wastes working time. In addition, once disassembled and replaced, the photovoltaic panels may be directly damaged due to carelessness, resulting in material waste. The direct consequences from the above reasons lead to high later maintenance cost of the solar photovoltaic panels.

SUMMARY OF PRESENT INVENTION

Aiming at the defects in the prior art, the disclosure provides a foolproof electrical connector interface system capable of realizing rapid concatenation and convenient disassembly, assembly and maintenance.

In order to achieve the above aim, the technical solution adopted by the disclosure is as follows: a foolproof electrical connector interface system comprises a connector male, a connector female, two fixing plates and two junction boxes, the connector male and the connector female are respectively fixed in installing slots arranged at two opposite ends of a photovoltaic panel; the bottoms of the fixing plates are provided with positioning columns, symmetrical first hooks and symmetrical second hooks; the fixing plates are fixedly connected with the photovoltaic panel through the positioning columns matched with positioning holes arranged on the photovoltaic panel, and then the connector male and the connector female are respectively fixed between the first hooks and between the second hooks; the connector male and the connector female are electrically connected by a wire; the connector male is provided with a male plug; the male plug is provided with a bump; the connector female is provided with a female plug matched with the male plug of the connector male; the female plug is provided with a groove matched with the bump; conductive metal sheets electrically connected with photovoltaic panel electrifying sheets are arranged in the junction boxes; the conductive metal sheets are electrically connected with an external wire; the junction boxes are waterproof junction boxes; the photovoltaic panel electrifying sheet of one junction box is electrically connected with the connector male through the wire; and the photovoltaic panel electrifying sheet of the other junction box is electrically connected with the connector female through the wire.

In a further improvement, the connector male is provided with a buckle near the male plug; and the connector female is provided with a clamping slot matched with the buckle near the female plug.

In a further improvement, the connector male and the connector female are 2-pin connectors.

In a further improvement, the connector male and the connector female both have plastic housings.

With the technical solution of the disclosure, the following problems are solved and benefits are produced as follows. First, the wires will not be inserted by mistake; and a foolproof function is performed. Second, the connector and the extension wire can be replaced without disassembling the photovoltaic pane. Third, the trouble of wiring is reduced. Fourth, the electrical connector and the extension wire are assembled before the photovoltaic panel is installed, which is more convenient and saves more installation time. Fifth, under equivalent conditions, the product is light and compact.

DETAILED DESCRIPTION OF PREFERRED EMBODIMENTS

The preferred embodiments of the disclosure are further described below with reference to the drawings.

Figure 1:
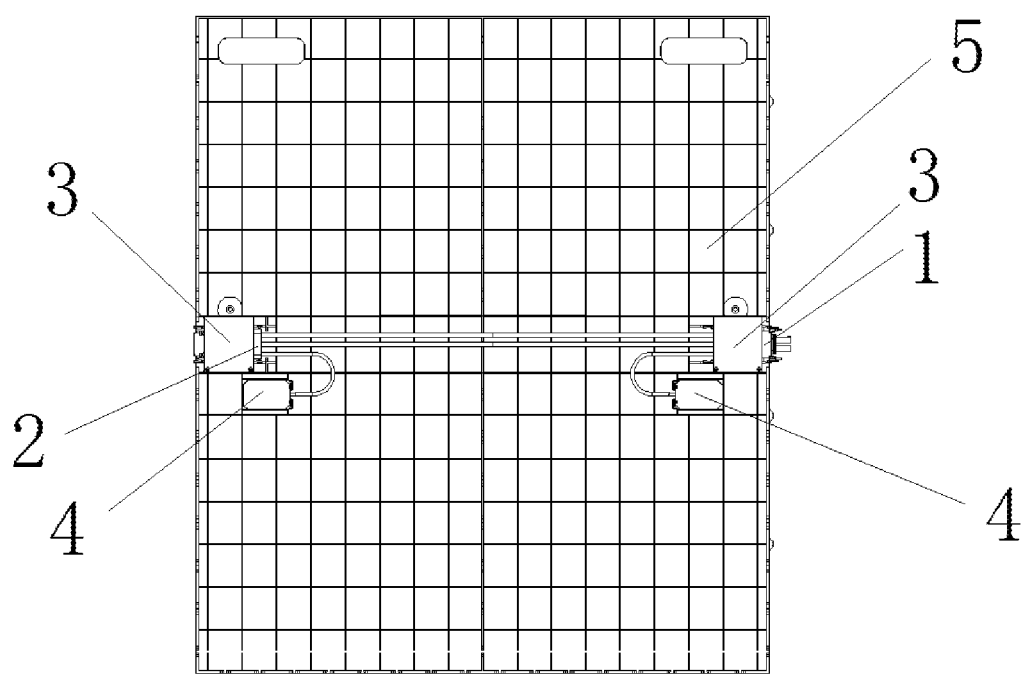
FIG. 1 is a schematic diagram of a foolproof electrical connector interface system.
Figure 2:
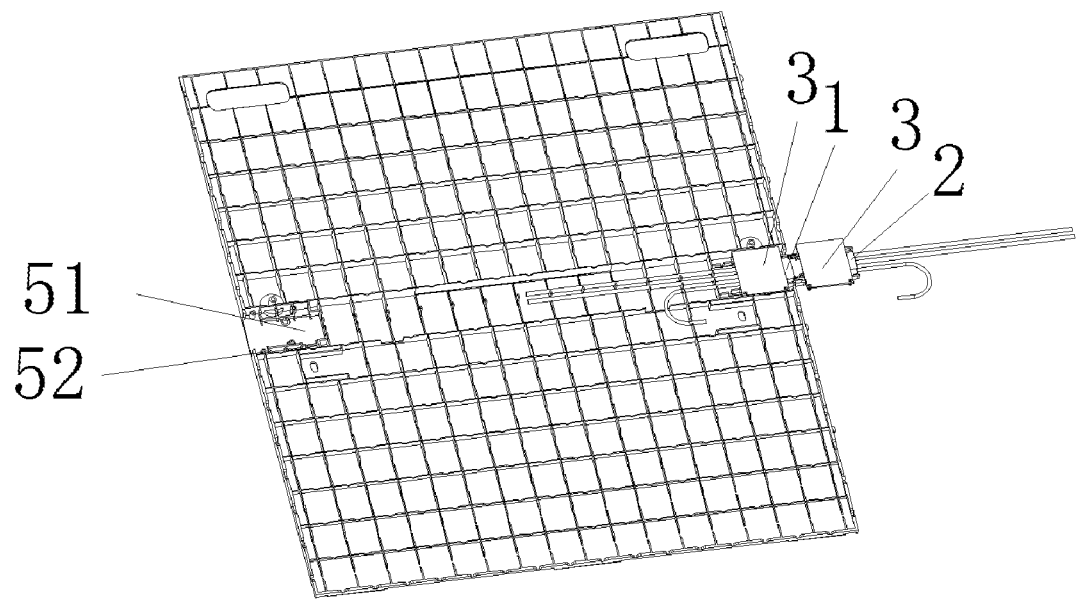
FIG. 2 is a exploded schematic diagram of a foolproof electrical connector interface system.
Figure 3:
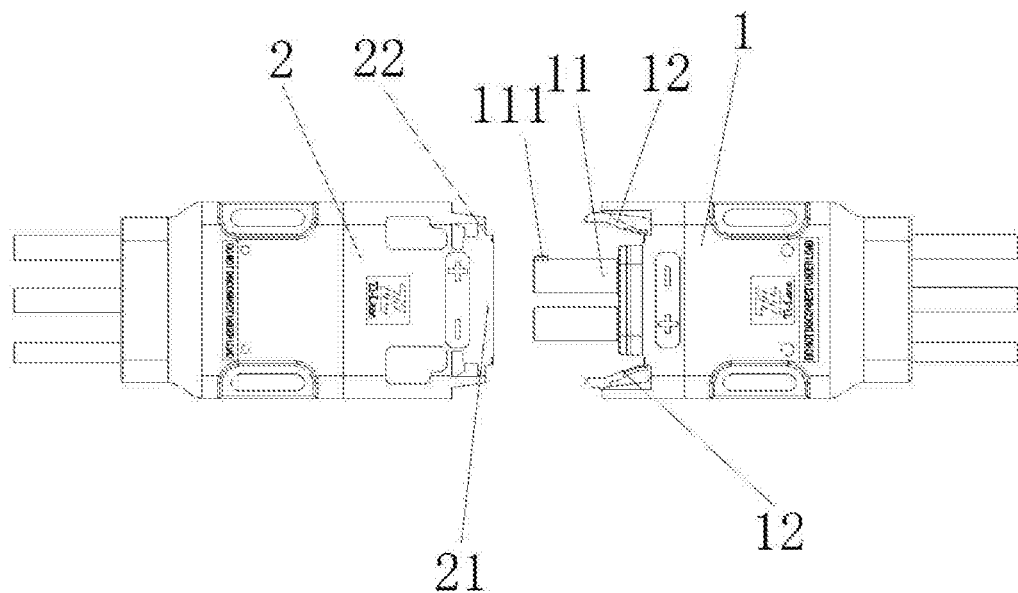
FIG. 3 is a schematic diagram showing a connector male and a connector female.
Figure 4:
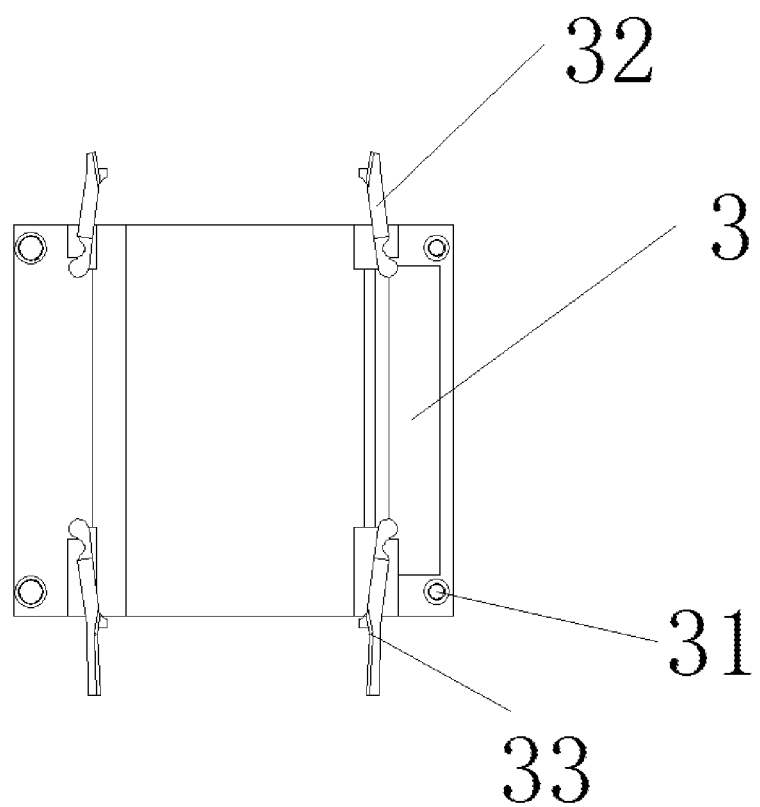
FIG. 4 is a bottom view of a fixing plate.

As shown in FIG. 1 to FIG. 4, a foolproof electrical connector interface system comprises a connector male 1, a connector female 2, two fixing plates 3 and two junction boxes 4.

The connector male 1 and the connector female 2 are respectively fixed in installing slots 51 arranged at two opposite ends of a photovoltaic panel 5; the connector male 1 is provided with a buckle 12 near the male plug 11; and the connector female 2 is provided with a clamping slot 22 matched with the buckle near the female plug 21. The connector male and the connector female are 2-pin connectors. The connector male and the connector female both have plastic housings.

The bottoms of the fixing plates 3 are provided with positioning columns 31, symmetrical first hooks 32 and symmetrical second hooks 33; the fixing plates 3 are fixedly connected with the photovoltaic panel through the positioning columns matched with positioning holes 52 arranged on the photovoltaic panel, and then the connector male and the connector female are respectively fixed between the first hooks and between the second hooks; the connector male and the connector female are electrically connected by a wire; the connector male is provided with a male plug; the male plug 11 is provided with a bump 111; the connector female is provided with a female plug matched with the male plug of the connector male; the female plug is provided with a groove matched with the bump; conductive metal sheets electrically connected with photovoltaic panel electrifying sheets are arranged in the junction boxes; the conductive metal sheets are electrically connected with an external wire; the junction boxes are waterproof junction boxes; the photovoltaic panel electrifying sheet of one junction box is electrically connected with the connector male through the wire; and the photovoltaic panel electrifying sheet of the other junction box is electrically connected with the connector female through the wire.

In order to better illustrate the technical solution of the disclosure, the design concept and principle of the disclosure are further described.

Firstly, a 2-pin connector is designed to replace the previous two separate connectors. At the same time, a fixing mechanism and a locking mechanism are designed on the structure of the 2-pin connector to realize the assembly and disassembly functions and foolproof connection. A fixing plate and a lock are designed to fix the 2-pin connector. When the electrical connector is inserted, the connector can be fixed. A junction box is designed to replace the previous welding mode of the photovoltaic panel electrifying sheets and the external wires, thereby reducing the trouble of welding and the inconvenience of operation. The junction box designed herein is assembled before the photovoltaic panel is installed, which is convenient and quick.

The above embodiments are only used to describe the technical concepts and features of the disclosure, and are intended to enable those of ordinary skill in the art to understand and implement the contents of the disclosure, not intended to limit the protection scope of the disclosure. Any equivalent variation or modification made in accordance with the spirit and essence of the disclosure shall be included in the protection scope of the disclosure.

I claim:

1. A foolproof electrical connector interface system, comprising a connector male, a connector female, two fixing plates and two junction boxes, wherein the connector male and the connector female are respectively fixed in installing slots arranged at two opposite ends of a photovoltaic panel; bottoms of the fixing plates are provided with positioning columns, symmetrical first hooks and symmetrical second hooks; the fixing plates are fixedly connected with the photovoltaic panel through the positioning columns matched with positioning holes arranged on the photovoltaic panel, and then the connector male and the connector female are respectively fixed between the first hooks and between the second hooks; the connector male and the connector female are electrically connected by a wire; the connector male is provided with a male plug; the male plug is provided with a bump; the connector female is provided with a female plug matched with the male plug of the connector male; the female plug is provided with a groove matched with the bump; the junction boxes are waterproof junction boxes; one junction box is electrically connected with the connector male through a wire; and an other junction box is electrically connected with the connector female through a wire.

2. The foolproof electrical connector interface system according to claim 1, wherein the connector male is provided with a buckle near the male plug; and the connector female is provided with a clamping slot matched with the buckle near the female plug.

3. The foolproof electrical connector interface system according to claim 1, wherein the connector male and the connector female are 2-pin connectors.

4. The foolproof electrical connector interface system according to claim 1, wherein the connector male and the connector female both have plastic housings.

* * * * *